United States Patent [19]

Gerber

Best Available Copy

[11] E Re. 30,757

[45] Reissued Oct. 6, 1981

[54] CLOSED LOOP APPARATUS FOR CUTTING SHEET MATERIAL

[75] Inventor: Heinz J. Gerber, West Hartford, Conn.

[73] Assignee: Gerber Garment Technology, Inc., South Windsor, Conn.

[21] Appl. No.: 122,495

[22] Filed: Feb. 19, 1980

Related U.S. Patent Documents

Reissue of:

[64] Patent No.: 4,133,235
Issued: Jan. 9, 1979
Appl. No.: 790,149
Filed: Apr. 22, 1977

[51] Int. Cl.[3] ..... B26D 5/00; B26F 1/38; D06H 7/00

[52] U.S. Cl. ..... 83/74; 83/174; 83/747; 83/756; 83/925 CC

[58] Field of Search ..... 83/74, 174, 747, 756, 83/925 CC, 72, 758, 49

[56] References Cited

U.S. PATENT DOCUMENTS

| | | | |
|---|---|---|---|
| 2,914,100 | 11/1959 | Lindholm | 83/74 |
| 2,914,102 | 11/1959 | Lindholm | 83/74 |
| 3,772,949 | 11/1973 | Pavone et al. | 83/925 CC |
| 3,803,960 | 4/1974 | Pearl et al. | 83/56 |
| 3,835,747 | 9/1974 | Bystron | 83/74 X |
| 3,848,490 | 11/1974 | Arel | 83/756 X |
| 4,016,787 | 4/1977 | Sugimoto | 83/756 |
| 4,085,636 | 4/1978 | Eklund | 83/74 X |

*Primary Examiner*—Willie G. Abercrombie
*Attorney, Agent, or Firm*—McCormick, Paulding & Huber

[57] ABSTRACT

A method and apparatus for cutting sheet material utilizes a closed loop automatically controlled cutting machine having a reciprocating cutting blade as the cutting tool. Sheet material to be cut is spread in multiple plies to form a layup, and the cutting blade and the material are then moved relative to one another in cutting engagement along predefined lines of cut. During cutting, a sensor detects a cutting parameter that is affected by the interaction of the cutting blade and sheet material, and signals provided by the sensor are fed back in the closed loop automatic control mechanism to adjust or initiate further steps in the cutting operation. Such adjustment or initiation alters the cutting machine operation for cutting conditions in real time in order to improve the overall performance of the machine.

27 Claims, 10 Drawing Figures

CLOSED LOOP APPARATUS FOR CUTTING SHEET MATERIAL

Matter enclosed in heavy brackets [ ] appears in the original patent but forms no part of this reissue specification; matter printed in italics indicates the additions made by reissue.

CROSS REFERENCE TO RELATED APPLICATIONS

This application contains subject matter disclosed in related copending applications of the same inventor Ser. No. 790,035 filed Apr. 22, 1977 and entitled Method and Apparatus for Cutting Sheet Material With Improved Accuracy, *now U.S. Pat. No. 4,133,234* and Ser. No. 789,848 filed Apr. 22, 1977 entitled Method of Cutting Sheet Material With Scheduled Supplementation, *now U.S. Pat. No. 4,140,037.*

BACKGROUND OF THE INVENTION

The present invention relates to [a ] *an* apparatus for cutting sheet material with a closed loop control. More particularly, the present invention relates to an automatically controlled machine for cutting sheet material with a cutting tool such as a reciprocating blade and means for sensing a cutting parameter during cutting in order to adapt the automatic controls to existing conditions and improve overall performance.

It is well known to use automatically controlled cutting machines for cutting limp sheet material used in garments, upholstery, and other items. Such machines conventionally derive information defining the articles or patterns to be cut from a marker. The marker is a closely arranged array of pattern pieces in positional relationship for cutting from a layup of sheet material. The contours of the pattern pieces which define the cutting paths to be followed by the cutting blade are the raw data which are utilized by the automatically controlled cutting machine in guiding the cutting blade, and such data is translated by the machine into machine commands by appropriate hardware. For example, the marker may be digitized to reduce the contours to point data and then the point data is processed through a computer or data processor to generate machine commands which translate the cutting blade and sheet material relative to one another. The marker data may be preprocessed and recorded for subsequent use in a cutting machine or the data may be processed during the cutting operation.

Other information systems may be used for acquiring and then using the raw data. For example, line followers may be used to transpose marker data from graphic material or templates, and the data can then be processed by other hardware which may include either analog or digital equipment, for example.

In most prior art cutting systems which are automated, the cutting operation is substantially fixed by pre-established programs and the marker data. Thus, the maneuvering of the cutting blade along a desired line of cut is controlled in accordance with relatively standard routines that have proven in general to be suitable for many cutting conditions but not necessarily all cutting conditions nor unanticipated conditions. For example, the standard cutting operation may not be suitable or may produce poor results with certain types of limp sheet material, with layups of substantial depth and even within a single layup displaying different cutting characteristics under different conditions. In U.S. Pat. No. 3,803,960, a system is disclosed which constitutes an improvement over the earlier systems in that some degree of flexibility in the cutting program is provided by allowing the person digitizing the marker to call for special cutting blade maneuvers, such as yawing and reduced feed rates, under limited circumstances. Yawing refers to the rotation of a cutting blade away from a position tangent to a cutting path or parallel with the path velocity vector of the blade. Still, a more flexible and a more responsive control system is desirable.

Accordingly, it is desirable to have an automatic cutting machine which is responsive to different cutting conditions as they occur in a cutting operation. By adjusting or initiating special control functions during the course of the cutting operation in response to a sensed condition, the overall performance of an automatically controlled cutting machine and the quality of the resulting product will be improved.

A closed loop control system for an automatically controlled cutting machine is disclosed in U.S. Pat. No. 3,848,490 having the same assignee as the present invention. In the prior art patent, a pressure sensor is utilized to detect previous cuts in the sheet material in the immediate vicinity of the cutting blade, and corrective adjustment in the automatic blade control mechanism is made in response to feedback signals generated by the pressure sensor. The corrective adjustment may reduce the feed rate as the cutting blade passes the previous cut or the blade may be given yaw commands which rotate the blade slightly out of alignment with the desired cutting path in the same region.

It is believed that more meaningful information concerning the cutting operation can be derived continuously from the interaction of the cutting blade and sheet material and corrective adjustment and other operations can be regulated accordingly. It is, therefore, a general object of the present invention to provide a closed loop method and apparatus for controlling a cutting blade by sensing one or more cutting parameters as the blade advances in cutting engagement with the material and then utilizing the parameters to modify the cutting operation.

SUMMARY OF THE INVENTION

This invention resides in a closed loop apparatus for cutting sheet material. The apparatus is comprised of an automatically controlled cutting machine having a cutting blade and a cutting table defining a support surface on which the sheet material is positioned in a spread condition during cutting. Motor means move the cutting blade and sheet material relative to one another in cutting engagement, and control means are connected with the motor means to provide control signals which guide the cutting blade through the material along a predetermined cutting path.

Sensing means is operatively connected with the cutting blade and sheet material for detecting a cutting parameter manifested by the blade and material during the cutting operation and for producing a corresponding signal representative of the parameter. For example, a load sensor connected with the cutting blade senses forces produced on the blade by the interaction of the blade and material, and the forces are an important parameter revealing the then-existing conditions of the cutting operation.

Feedback means interconnect the sensing means and the control means to generate additional control signals and guide the cutting blade through the sheet material in accordance with the sensed cutting parameter. In cases where the sensor is a load sensor, the feedback signals from the sensor may be utilized to yaw the cutting blade, adjust the feed rate, change the blade or stroking speed, or perform other maneuvering or control functions.

The sensing and feedback means provide blade intelligence to the cutting machine and allow functional changes to take place in the closed loop control system in real time. The overall cutting operation is improved and the resulting product may be cut more accurately with ease under a variety of circumstances.

DESCRIPTION OF THE PREFERRED EMBODIMENTS

Figure 1:
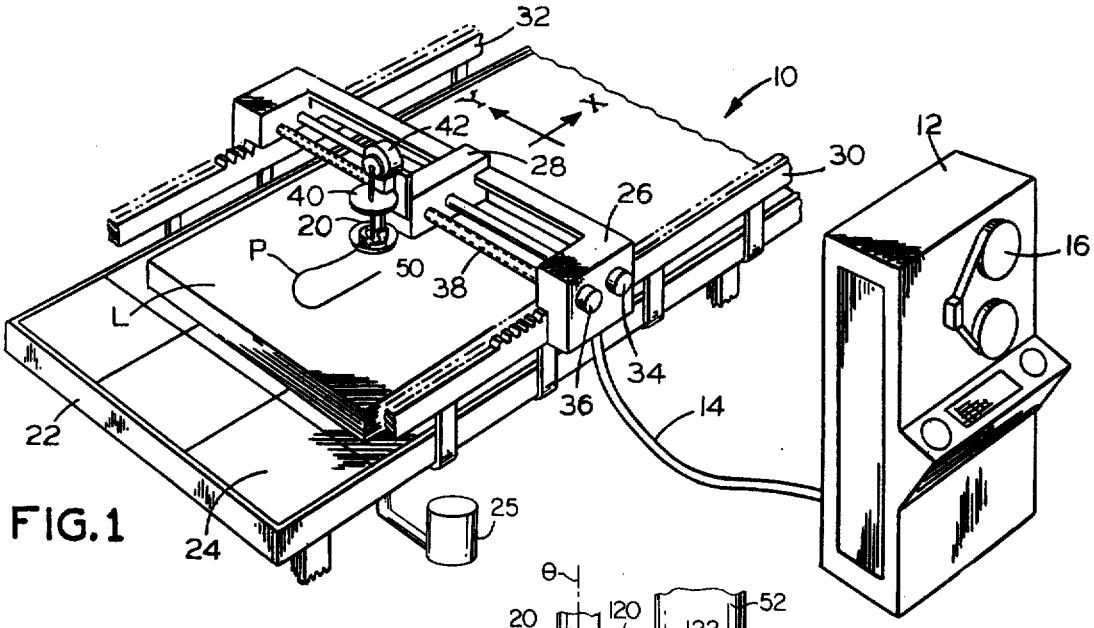
FIG. 1 is a perspective view of an automatically controlled cutting machine in which the present invention may be employed.

FIG. 1 illustrates an automatically controlled cutting machine, generally designated 10, of the type in which the present invention may be employed. The cutting machine 10 cuts pattern pieces in a marker from a single or multi-ply layup L of sheet material formed by woven or non-woven fabrics, paper, cardboard, leather, synthetics or other materials. The illustrated machine is a numerically controlled cutting machine having a control or computer 12 serving the function of a data processor, a reciprocated cutting blade 20, and a cutting table 22 having a penetrable vacuum bed 24 defining a support surface on which the layup is spread. From a program tape 16, the computer 12 reads the digitized data defining the contours of the pattern pieces to be cut and from an internally stored cutting machine program generates machine commands that are transmitted to the cutting table by means of a control cable 14. Signals generated at the table as described in greater detail below are also transmitted from the table back to the computer 12 through the cable. While a program tape has been illustrated as the basic source of cutting data, it will be appreciated that other digital or analog data input devices, such as a line follower illustrated and described in the referenced copending application Ser. No. 790,035 entitled Method and Apparatus for Cutting Sheet Material with Improved Accuracy, *now U.S. Pat. No. 4,133,234,* may be employed with equal facility.

The penetrable vacuum bed 24 may be comprised of a foamed material or preferably bristles having upper, free ends defining the support surface of the table. The bristles can be penetrated by the reciprocated cutting blade 20 without damage to either the blade or table as a cutting path P is traversed in the layup. The bed employs a vacuum system including the vacuum pump 25 as described and illustrated in greater detail in U.S. Pat. Nos. 3,495,492 and 3,765,289 having the same assignee as the present invention.

Figure 3:
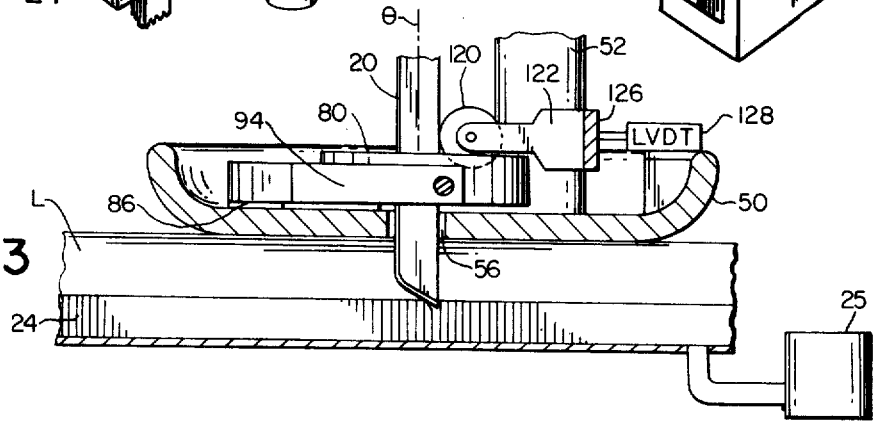
FIG. 3 is a fragmentary side elevation view, but with parts shown in section, of a presser foot around the cutting blade with sensors for detecting cutting parameters.

Although not shown in FIG. 1, an air impermeable overlay, may be positioned over the multi-ply layup L to reduce the volume of air drawn through the layup. The vacuum system then evacuates air from the bed 24 and the layup L as shown in FIG. 3 in order to make the layup more rigid and to compress or compact the layup firmly in position on the table at least in the zone where the cutting tool operates. A rigidized layup tends to react to the cutting blade more uniformly and hence is "normalized". A rigidized layup also improves the performance of the present invention as described in greater detail below.

The reciprocated cutting blade 20 is suspended above the support surface of the table by means of the X-carriage 26 and Y-carriage 28. The X-carriage 26 translates back and forth in the illustrated X-coordinate direction on a set of racks 30 and 32. The racks are engaged by pinions (not shown) rotated by an X-drive motor 34 in response to machine command signals from the computer 12. The Y-carriage 28 is mounted on the X-carriage 26 for movement relative to the X-carriage in the Y-coordinate direction and is translated by the Y-drive motor 36 and a lead screw 38 connecting the motor with the carriage. Like the drive motor 34, the drive motor 36 is energized by machine command signals from the computer 12. Coordinated movements of the carriages 26 and 28 are produced by the computer in response to the digitized data taken from the program tape 16 to translate the reciprocating cutting blade 20 along a cutting path P.

The cutting blade 20 is suspended in cantilever fashion from a rotatable platform 40 attached to the projecting end of the Y-carriage 28. The platform and the cutting blade are rotated about a $\theta$-axis (FIG. 3) extending longitudinally through the blade perpendicular to the sheet material by means of a $\theta$-drive motor 44 (shown in FIG. 2) which is also controlled from the computer 12. The motor 44 and rotatable platform serve the function of orienting the cutting blade at each point along the cutting path P. The rotatable platform 40 is vertically adjustable and elevates the sharp, leading cutting edge of the blade into and out of cutting engagement with sheet material on the table. An elevation motor (not shown) for moving the platform is also controlled by the computer 12. The cutting blade is also reciprocated by means of a stroking motor 42 supported above the platform 40. For a more detailed description of a blade driving and supporting mechanism, reference may be had to U.S. Pat. No. 3,955,458 issued to the assignee of the present invention.

Figure 4:
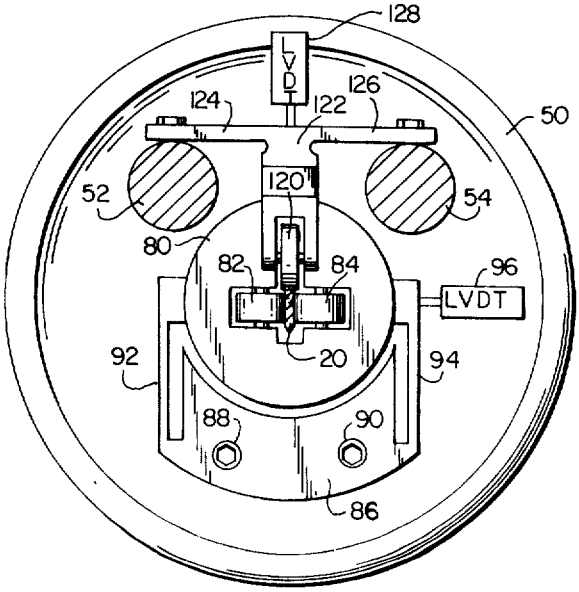
FIG. 4 is a top plan view of the presser foot and sensors in FIG. 3.

A presser foot 50 shown in greater detail in FIGS. 3 and 4 is suspended from the rotatable platform 40 by means of two vertical posts 52 and 54 which are slidably connected with the platform so that the presser foot rests upon the upper ply of the layup under its own weight during cutting. The presser foot surrounds the cutting blade 20 and has a central slot 56 through which the blade reciprocates. The cutting blade and the foot rotate together about the $\theta$-axis with the platform 40, and, therefore, the same positional relationship between the blade and the foot is maintained at all times. Accordingly, the sharp, leading cutting edge of the blade and the flat trailing edge are aligned in a central plane of the foot between the support posts 52 and 54, and the posts are always disposed rearwardly of the blade as it advances along a cutting path P.

In accordance with one aspect of the present invention, blade intelligence or information defining a cutting parameter is derived from the cutting blade and is fed back to the computer 12 for closed loop control of the machine 10 in order to produce supplemental machine command signals which adjust or add to the fundamental machine command signals and modify the motions of the cutting blade or initiate other machine functions.

Figure 2:
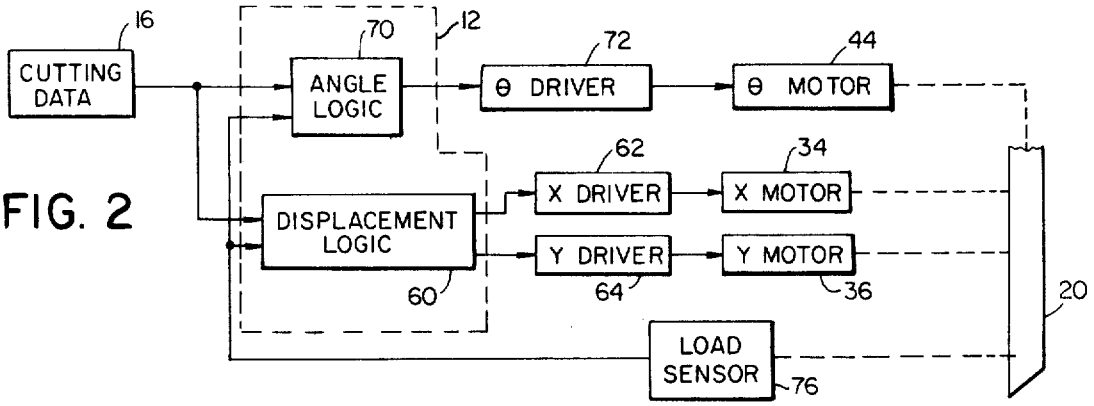
FIG. 2 is a schematic diagram illustrating a closed loop control system for the machine in one embodiment of the invention.

FIG. 2 illustrates an exemplary closed loop control system and the manner in which a sensed cutting parameter is utilized to maneuver the blade. Cutting data on the program tape 16 or from another source is utilized by the cutting machine program stored in the computer 12 to generate basic or fundamental machine commands which operate the X-drive motor 34 and the Y-drive motor 36 and translate the cutting blade relative to the sheet material layup along a predetermined cutting path. Translational commands which advance the cutting blade relative to the sheet material are generated by displacement logic circuits 60 which may be found in line follower apparatus, or the like, as well as numerical control apparatus and which include an adjustable feed rate circuit and are transmitted in the form of digital or analog signals to the X- and Y-drive motors 34 and 36 through X- and Y-drivers or amplifiers 62 and 64 respectively. In addition, in this embodiment of the invention, the angle logic circuits 70 receive cutting data and develop fundamental digitial or analog signals which are transmitted to the $\theta$-drive motor 44 by means of a $\theta$-driver or amplifier 72. The fundamental signals from the angle logic circuits rotate the cutting blade into positions generally aligned with or tangent to the cutting path at each point along the path. Thus, the drive motors 34, 36 and 44 completely define the position of the cutting blade in the sheet material and the rate at which the cutting blade and material are fed relative to one another during the cutting operation.

In order to monitor the cutting operation and make modifications or additions to the fundamental machine commands while cutting, a lateral load sensor 76 is connected with the cutting blade 20 and generates feedback signals which are transmitted to either or both the displacement logic circuits 60 and the angle logic circuits 70 for closed loop control. For example, lateral loading of the cutting blade generated by the interaction of the blade and sheet material can be used to add yaw signals to the $\theta$-command signals and thereby rotate the cutting blade slightly out of a position in alignment with the path. The yaw signal produced by the logic circuits 70 rotates the cutting blade and orients the blade so that the cutting edge is aimed slightly toward the side of the cutting path from which the forces are applied to reduce and preferably null the forces as the blade moves forward along the path.

Figure 5:
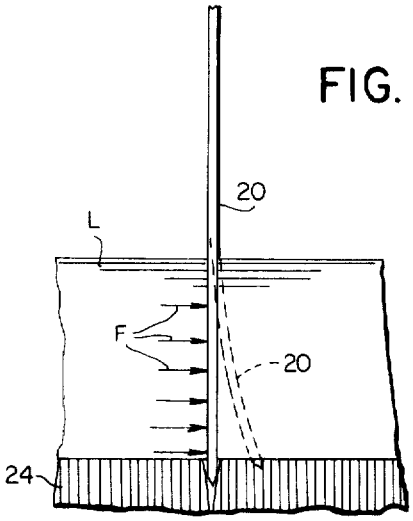
FIG. 5 is a cross sectional view of the cutting blade and sheet material layup illustrating the effects of lateral loading on the blade.

FIG. 5 illustrates the problem which is corrected when the lateral forces distributed along both sides of the cutting blade 20 are unbalanced. It will be appreciated that the net lateral forces F generated by the interaction of the blade and sheet material along the depending end of the blade deflect or bend the blade to the phantom position. Without corrective action and regardless of the accuracy with which the servomechanisms locate the upper end of the blade, the blade will track a cutting path in the upper ply of the layup slightly different from the cutting path in the lower ply, and the pattern pieces from the respective plies will have slightly different shapes. Obviously, all pattern pieces should be identical and correspond to the programmed cutting path.

By rotating the cutting blade with yaw signals toward the side of the cutting path from which the forces are applied, the unbalanced forces between the blade and the cloth are reduced, preferably to zero, as the blade advances. When the forces have been reduced, blade bending [the] *and* material shifting are also reduced and the blade tracks the cutting path through the material as programmed more accurately.

Figure 9:
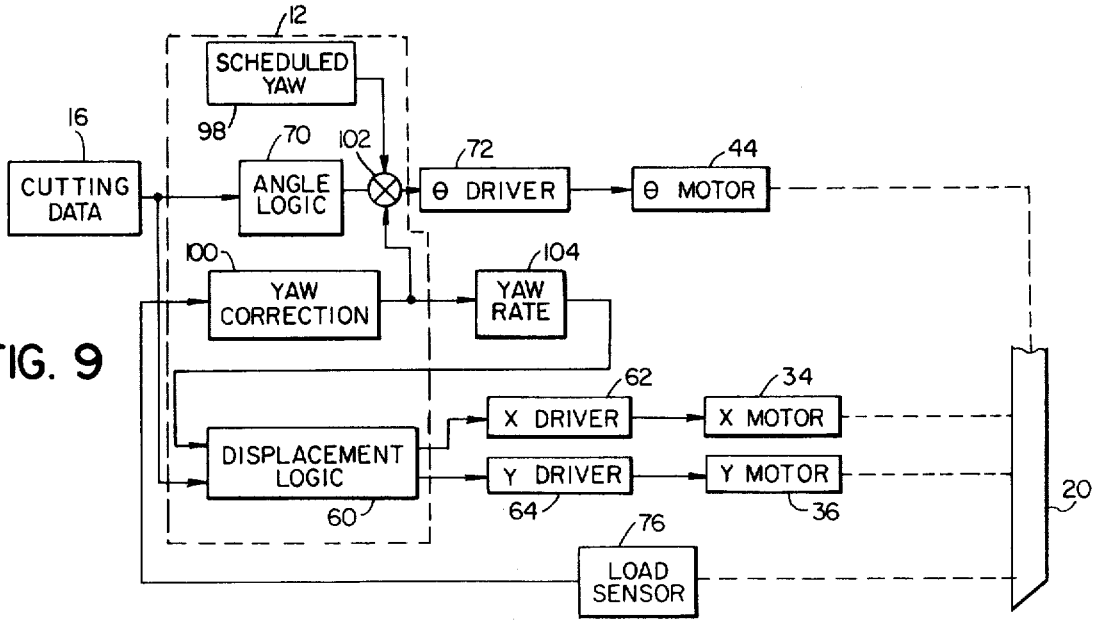
FIG. 9 is a schematic diagram illustrating a closed loop control system for the machine in another embodiment of the invention.

To this end, the lateral load sensor 76 associated with the blade detects lateral loads, and feedback signals from the sensor cause the angle logic circuits 70 in the $\theta$-command channel to react to the loads and produce yaw signals which correct the position of the cutting blade in the sheet material. Within the angle logic circuits of the computer 12, the feedback signals may be utilized in various manners to produce the yaw signals which supplement the basic $\theta$-command signals. For example, the feedback signals may actually change the logic or algorithm which computes the $\theta$-command signal in the computer as suggested in FIG. 2, or the feedback signals may be employed in separate circuitry of the computer to produce a separate signal that is algebraically combined with the $\theta$-command signal as shown in the embodiment of FIG. 9 described below. In effect, the cutting blade in reaction to the forces moves through the sheet material without the adverse influence of such blade forces and associated bending due to the information or blade intelligence derived by the sensor 76.

Figure 6:
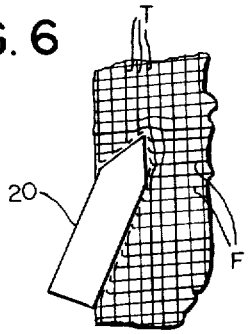
FIG. 6 is a fragmentary plan view of the cutting blade cutting through a woven sheet material at an angle to the fibers.

In practice, lateral or unbalanced forces on the cutting blade may be generated for a number of reasons. FIG. 6 illustrates the cutting blade 20 advancing in cutting engagement through woven sheet material at an angle to the fibers T and F. The parallel fibers T are shown transverse to the parallel fibers F but could have various geometric relationships and other fibers could also be included in the weave. It will be observed that the fibers T having an acute angular relationship with the blade are pushed slightly to one side by the blade before they are cut. When the fibers are pushed, they exert a reacting force on the blade, and in a multi-ply layup of material the sum of the forces can be substantial and produce the bending effect shown in FIG. 5. Similar effects are observed in knits and other materials. Factors which affect the phenomenon illustrated in FIG. 6 include the angular relationship between the cutting blade and fibers, the sharpening angle, blade sharpness, size and shape, and the strength of the fibers.

Another reason for unbalanced forces on the cutting blade is associated with the layup. Limp sheet material tends to provide weaker pressure or support on the side of the blade close to the edge of the layup or an opening within the layup such as a previous cut. For example, in FIG. 7, a cutting blade 20 is illustrated at successive positions along a cutting path P1 as the blade translates closely adjacent a previously made cut on the cutting path P2. In the vicinity of the previous cut along the cutting path P2, the sheet material between the paths can yield more easily, and reduce the lateral support at the one side of the blade adjacent path P2.

Figure 7:
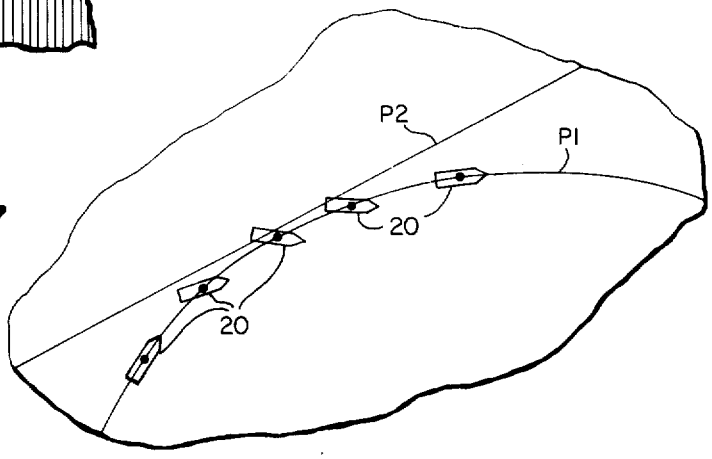
FIG. 7 is a fragmentary plan view of the sheet material layup and illustrates automatic blade maneuvering produced by the closed loop control system in FIG. 2.

With the lateral load sensor connected in the closed loop control system as illustrated in FIG. 2, the cutting blade in FIG. 7 translates toward the point of closest approach and is rotated slightly out of alignment with the cutting path P1 and away from the previous cut due to the weaker support on the left-hand side of the blade and the higher loading on the right-hand side. The greatest degree of yaw is observed at the point closest to the cutting path P2 to counteract the greatest unbalance in the lateral forces on the blade at this point. Thereafter the yaw correction signal gradually disappears as the knife progresses along the cutting path P1 and departs from the cutting path P2. The illustrated yaw angles of the cutting blade are exaggerated for the purpose of explanation and in general would not exceed 10°, but angles as high as 25° or more may be utilized in certain cases. It will be understood that it may sometimes be preferable to have the pattern pieces closely adjacent rather than tangent. If the paths in FIG. 7 had been tangent, the blade would fall into the previous cut on path P2 near the point of tangency, and would experience no lateral loading at that point. With yaw correction derived only from the lateral load sensor 76, no corrective yaw would be available to restore the blade to tracking path P1 until after the blade had translated in the cut along path P2 beyond the tangent point. With a close approach condition as shown, corrective yaw is imposed at all points within the vicinity of path P2 and more accurate cutting prevails.

Figure 8:
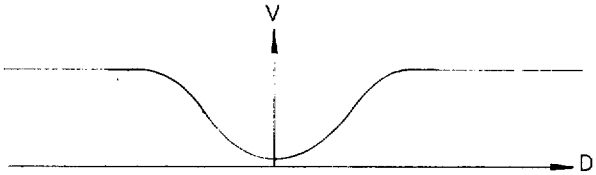
FIG. 8 is a diagram illustrating the feed rate variation caused by the closed loop control system in FIG. 2 along the cutting path illustrated in FIG. 7.

Referring again to FIG. 2, it will be noted that the force feedback signals from the sensor 76 are also applied to the displacement logic circuits 60. Within the circuits 60, the feedback signals command a reduction of the feed rate along the cutting path under the same circumstances which produce the yaw commands in the angle logic circuits 70. The reduced feed rate permits the yaw corrections to be made where needed along the cutting path in spite of lag in the $\theta$-channel servosystem, and also reduces the overall load factor in the cutting blade at critical points along the cutting path. Thus, in FIG. 7, the feed rate of the cutting blade 20 along the path P1 is reduced as the blade translates in close proximity to the previous cut on the cutting path P2 and is increased after the point of closest approach has been passed. The change in the velocity profile or feed rate of the cutting blade as the blade moves past the point of closest approach is illustrated in the velocity/displacement diagram of FIG. 8. The minimum velocity corresponds to the point on the cutting path P1 closest to the cutting path P2.

As indicated above, the displacement and $\theta$-command signals can be modified by the cutting parameter detected by the sensor 76 either individually or in combination. Furthermore, the sensed cutting parameter may be utilized to correct or modify other controlled variables such as the blade speed or stroking rate.

The sensing of blade forces may be accomplished by means of a blade guide mechanism in the presser foot 50 of FIGS. 3 and 4. Mounted with the presser foot is a circular mounting plate 80 that supports two guide rollers 82 and 84 disposed at opposite sides of the cutting blade 20 in rolling contact with the blade. Thus, the plate 80 maintains a fixed positional relationship laterally of the blade and tracks lateral motions of the blade.

A resilient mount 86 for the plate 80 is secured to the presser foot 50 by means of bolts 88 and 90 and includes two flexible arms 92 and 94 that are attached to diametrically opposite sides of the plate 80. The spring constant of the arms 92 and 94 is made relatively high so that the rollers 82 and 84 provide a degree of lateral rigidity to the cutting blade, but at the same time, permit limited lateral displacement of the blade under load. Thus, the displacements of the plate 80 are directly proportional to the loads applied to the blade and a position transducer 96 in the form of a linear variable differential transformer (LVDT) can serve as the lateral load sensor 76 in FIG. 2.

The invention is also advantageously employed in combination with the penetrable vacuum bed 24 of the cutting machine 10 in FIG. 1. When the layup L of sheet material has been rigidized by the applied vacuum at least in the locality of the blade, the forces operating between the blade and the material are generated more rapidly and are greater for a given error. As a consequence, the force feedback signals have a higher signal quality or clarity and the closed loop control system can provide an improved response due to the clearer signal. Furthermore, the resilient bristles in the bed 24 help develop the forces on the blade through the material. The free ends of the bristles do not allow the material to slip on the support surface of the table and deflect resiliently with the material when forces are generated between the blade and the lowest plies of the layup. Thus, the resilient restraint of the plies by the bristle holds the material and aids in the development of forces on the lower part of the blade, especially when the material is very limp and incapable of transmitting in-plane compression forces.

Another embodiment of the closed loop control system is illustrated in FIG. 9 where corresponding elements bear the same reference numerals as above. In this embodiment, the angle of the cutting blade is first computed from the cutting data 16 by means of the angle logic 70 and then is modified or supplemented by both a scheduled yaw program 98 and the dynamic yaw signal derived from the lateral load sensor 76 connected with the cutting blade. The force signal from the sensor is fed back to a yaw correction circuit 100 which generates the yaw signal independently of the yaw logic circuits 70. This yaw signal derived from the sensor is combined with a fundamental $\theta$-command signal and a scheduled yaw signal at a summing node 102. The scheduled yaw signal may be read from a stored program which is previously established in the computer 12 as, for example, a function of the geometry of the cutting path, rather than a variable parameter such as the lateral forces detected by the sensor 76. Other scheduled yaw signals and the method of obtaining such signals are described and illustrated in greater detail in the referenced copending applications Ser. Nos. 790,035 and 789,848, *now U.S. Pat. Nos. 4,133,234 and 4,140,037*.

The signals combined at the summing node 102 form a single machine command signal that is transmitted to the driver 72 to operate the $\theta$-drive motor 44 and orient the blade. It should be understood that in most circumstances when scheduled yaw is employed in combination with yaw derived from blade forces, the scheduled yaw program if properly selected should provide the primary corrections for reducing blade loading, and more limited and finer corrections are produced by the feedback signals from the load sensor. Thus, the closed looped control system may be used both alone and in conjunction with other correction systems to improve cutting accuracy.

The yaw signal from the correction circuit 100 is also fed to a yaw rate circuit 104. The rate of change of yaw is derived by the circuit 104 and is transmitted to the displacement logic circuit 60 in place of the feedback signal for the purpose of reducing the feed rate of the cutting blade along the cutting path. Thus, the displacement command signals from the circuits 60 reduce the feed rate of the cutting blade whenever yaw corrections are made and the reduction is proportional to the rate of change of the derived yaw.

Figure 10:
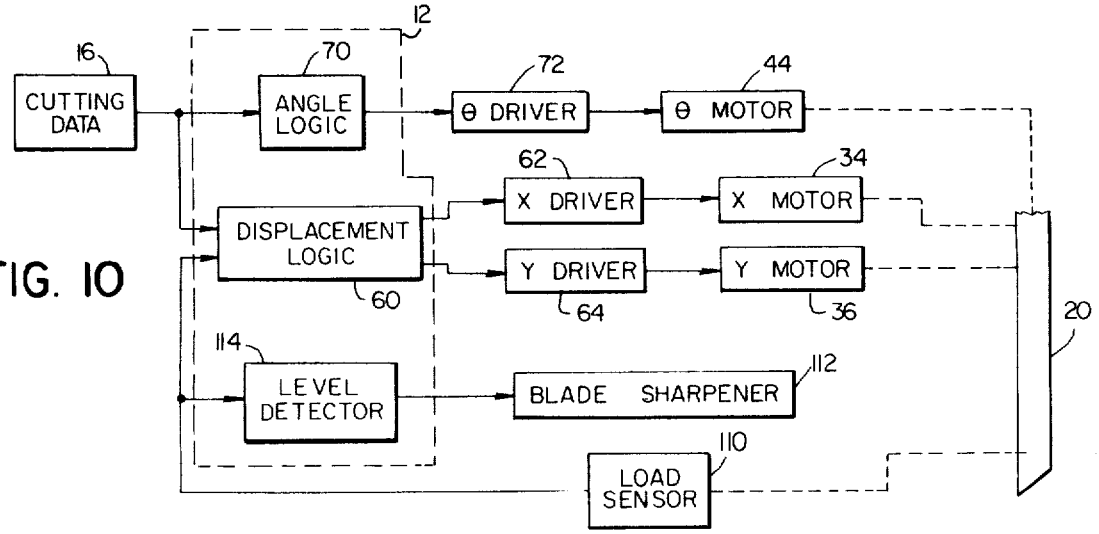
FIG. 10 is a schematic diagram illustrating a closed loop control system in still another embodiment of the invention.

FIG. 10 illustrates [stil] *still* another embodiment of the closed loop control system and again corresponding elements bear the same reference numerals as above. In this embodiment, the parameters of the cutting operation are monitored by means of a fore-and-aft load sensor 110 which detects rearward forces applied to the cutting blade as it advances along a cutting path. The rearward forces are indicative of a number of cutting parameters, such as the sharpness of the cutting blade, a broken blade, the density or toughness of the sheet material, the depth of the sheet material layup and an opening in the layup such as that at a previous cut or the edge of the layup.

The fore-and-aft load sensor 110 in the embodiment of the control illustrated in FIG. 10 is utilized to modify the feed rate in the displacement logic circuits 60 and also to initiate operation of a blade sharpener control 112 through a level detector 114. The displacement logic circuits 60 respond to the feedback signals from the sensor 110 by reducing the feed rate of the cutting blade along the cutting path in the same manner as the load signals in the embodiment of FIG. 2 The reduced feed rate causes the reciprocating cutting blade to generate more cutting strokes for each unit length of cutting path which eases the cutting burden and at the same time reduces stress caused by fore-and-aft blade loading. Such response of the control mechanism also automatically adjusts the feed rate of the cutting blade in accordance with the difficulty or toughness of the sheet material being cut, the height of the layup and the sharpness of the cutting edge of the cutting blade. If desired, the displacement logic may be limited to reducing the speed of the cutting blade only above a preselected force level.

The displacement logic circuit may also be adapted to reduce the speed of the cutting blade below a preselected force level. For example, if a cutting blade reaches the edge of the sheet material layup or approaches a previous cut in the middle of the layup while the cutting blade is traveling at maximum speed, it is desirable that the speed be reduced. Furthermore, if the blade breaks and the rearward force disappears entirely, the X- and Y-carriages should stop completely. Thus, the displacement logic circuits may include several level detectors to bracket a range of rearward forces in which the blade is expected to operate.

The rearward force feedback signal applied to the displacement logic circuits 60 is also applied to the level detector 114 in order to generate a dull-blade signal whenever the forces exceed a predetermined level above that which causes a variation in the feed rate of the cutting blade. The dull-blade signal is supplied to the sharpener control 112 to initiate operation of a blade sharpener such as illustrated and described in greater detail in U.S. patent application Ser. No. 648,540 filed on Jan. 12, 1976, now U.S. Pat. No. 4,033,214 same assignee as the present invention. Since blade sharpening operations are not normally carried out until the cutting blade reaches a convenient stopping point along the cutting path, such as a sharp angle or corner which requires lifting the blade out of engagement with the sheet material, the dull-blade signal may be utilized to set the sharpener control for operation at the next lifting of the blade.

The rearward force signal can also be used to regulate the blade speed or stroking rate as an alternative to or in conjunction with the feed rate control. In general, heavier rearward forces indicate more difficult cutting due to heavier or tougher sheet material and thicker layups. In such situations, a greater number of strokes per unit of displacement are desired, and the feedback signal from load sensor 110 readily provides the necessary information for regulating the speed of the stroking motor 42 (FIG. 1). If the reduction in rearward forces at the edge of a layup calls for a reduction in the feed rate of the blade through the material, the feedback signal in such case may also reduce the stroking rate to limit the heat generated by the cutting blade and thereby prevent fusing or burning of the sheet material. Of course a blade temperature sensor could perform the same function.

Sensing means for detecting rearward forces applied to the cutting blade is also illustrated within a presser foot 50 in FIGS. 3 and 4 as part of the blade guide mechanism. A guide roller 120 is supported at the flat rear edge of the cutting blade by means of a yoke 122 attached to support posts 52 and 54 of the presser foot. The yoke includes resilient arms 124 and 126 which have spring constants selected to permit limited rearward displacement of the guide wheel 120 and the cutting blade 20 when rearward forces are applied to the blade. A position transducer 128 in the form of another linear variable differential transformer (LVDT) detects the displacement of the yoke and blade and produces a signal which is proportional to both the displacement and the rearward force. Accordingly, the yoke and transducer are equivalent to the load sensor 110 in FIG. 10, and provide a feedback signal suitable for use by the displacement logic circuitry 60 and the level detector 114.

In summary, an automatically controlled cutting machine has been disclosed with various embodiments of a closed loop control system that responds to cutting parameters in the course of a cutting operation. Intelligence derived from the cutting parameters is fed back in the closed loop system and modifies or adds to the fundamental machine commands in order to execute the cutting operation with greater accuracy, efficiency and ease. Cutting parameters which provide useful intelligence concerning the interaction of the cutting blade and sheet material include lateral forces, which are generally transverse to the cutting path, and rearward forces, generally in alignment with the cutting path. The energy or power imparted to the cutting blade through its actuating mechanism may also be monitored by the voltage and current required to drive the stroking motor 42 and still other cutting parameters such as torque, temperature and heat can provide meaningful information singly or in combination for closed loop control. Once a cutting parameter has been detected, feedback signals related to the parameter may be processed by the closed loop control system to modify the cutting operation according to either linear or non-linear functions.

While the present invention has been disclosed in a number of embodiments, further modifications and substitutions can be made within the scope of the invention. Various types of sensing means may be utilized to sense the cutting parameters. For example, instead of the position transducers which measure the deflection of the cutting blade produced by the forces, a strain gauge may be attached outside or within the blade or its supporting structure for the same purpose. Of course, other types of sensors such as optical, thermal, capacitive or magnetic sensors may also be used. While the sensors illustrated and described have been associated more directly with the cutting blade, the interaction of the blade and sheet material can have equal or more significant effects upon the sheet material and thus sensors connected more closely with the material may be utilized. The invention has utility with other types of cutting blades such as blades shown in U.S. Pat. No. 3,245,295 which cooperate with a foot that moves under the layup on a non-penetrable bed. The closed loop control system may be intermittently activated or may provide increased correction in response to signals identifying critical cutting locations such as points of tangency or close approach. For example, in systems utilizing line followers, a point of tangency may be identified by the line follower as the tangency comes into view and the line follower may increase the response to the feedback signal from the cutting blade to increase the amount of yawing or slowdown produced by the blade forces. Of course, in other systems, identification of critical locations may be obtained from other sources such as an automatic marker generator which establishes the positioning of the pattern pieces in a marker or the control computer 12 which processes the digitized data and produces the machine commands. Accordingly, the invention has been described and shown in several forms by way of illustration rather than limitation.

I claim:

1. An automatically controlled cutting machine for accurately cutting limp sheet material comprising:

a cutting blade *having a leading cutting edge, a trailing edge and two sides extending between the leading and trailing edges, the two sides at the leading edge meeting at an angle to form a sharp knife edge for cutting the limp sheet material;* a cutting table defining a support surface on which sheet material is positioned in a spread condition for cutting by the cutting blade;

motor means for moving the cutting blade and the sheet material relative to one another in cutting engagement;

control means connected with the motor means and providing control signals to the motor means for guiding the cutting blade through the material along a predetermined cutting path;

sensing means operatively associated with the cutting blade and sheet material for detecting lateral forces applied to the *sides of the* blade by the material as the *sharp leading knife edge of the* blade advances through the material in cutting engagement, the sensing means also producing a signal corresponding to the detected lateral forces; and feedback means interconnecting the sensing means and the control means for generating additional control signals to regulate the cutting of the material by the blade along the predetermined cutting path in response to the detected forces.

2. Apparatus for cutting limp sheet material as defined in claim 1 wherein the sensing means comprises a load sensor for sensing forces applied laterally to the blade by the material.

3. Apparatus for cutting as defined in claim 2 wherein the load sensor is connected with the blade to detect lateral loads applied to the blade.

4. Apparatus for cutting sheet material as defined in claim 1 wherein:

a blade guide is provided in the cutting machine and supports the blade along an axis generally perpendicular to the sheet material spread on the cutting table; and the sensing means comprises a load sensor interposed between the blade guide and the cutting machine to detect blade loading during cutting.

[5. Apparatus as defined in claim 4 wherein a presser foot surrounding the cutting blade is also provided in the cutting machine and rests upon the sheet material during cutting; and the blade guide and load sensor are mounted in the presser foot.]

6. Apparatus for accurately cutting sheet material as defined in claim 1 wherein:

the cutting blade extends through the sheet material along an axis generally perpendicular to the material;

the motor means includes means for rotating the blade and sheet material relative to one another about the perpendicular axis to orient the blade along the cutting path at each point; and the feedback means is connected with the means for rotating for orienting the cutting blade in accordance with the detected lateral forces.

7. Apparatus for cutting sheet material as defined in claim 6 wherein the sensing means is a sensor detecting side loads upon the cutting blade and the feedback means and the means for rotating the cutting blade are interconnected to rotate the cutting blade in a direction that reduces the side loads.

8. An automatically controlled cutting machine as described in claim 1 wherein:

the cutting blade is a reciprocating cutting blade; and the cutting table has a penetrable bed defining the support surface on which the material is spread, the bed being penetrable by the cutting blade as the blade reciprocates during cutting.

[9. An automatically controlled cutting machine as defined in claim 8 wherein the penetrable bed is comprised of bristles having free ends substantially in a common plane defining the support surface of the table whereby the blade penetrates through the support surface and between the bristles during cutting.]

10. An automatically controlled cutting machine as defined in claim 9 further including means for generating a vacuum within the bristles for rigidizing the sheet material spread on the support surface.

11. An automatically controlled cutting machine for cutting limp sheet material as defined in claim 1 further including means for evacuating air from a multi-ply layup of sheet material on the cutting table to compress and rigidize the layup for cutting.

12. In combination in an automatically controlled cutting machine having a *reciprocated* cutting blade *in the form of a knife mounted at one end in cantilever fashion with the opposite end free and rigidly supported from said one end for penetration through limp sheet material and having a sharp, leading cutting edge* which translates relative to *the* sheet material in a spread condition, the cutting machine including displacement means for guiding the *sharp, leading* cutting *edge of the* blade in cutting engagement with the material along a predefined line of cut and means for orienting the cutting blade about an axis generally perpendicular to the sheet material at each point along the line of cut, the improvement comprising:

detecting means for producing information defining blade side loads generated by the interaction of the cutting blade and the sheet material as the blade is guided along the line of cut by the displacement means; and reacting means responsive to the detected cutting information and generating blade orientation signals in accordance with the detected information, and applying the orientation signals to the orienting means to reduce blade side loads.

13. The combination of claim 12 in an automatically controlled cutting machine having a cutting blade with a cutting edge and a blade sharpener for sharpening the cutting edge of the blade wherein the detecting means comprises a sensor producing an output indicative of the condition of the cutting edge of the blade; and the reacting means comprises a control regulating the operation of the blade sharpener and responsive to the output of the sensor to control initiation of a sharpening operation.

14. The combination of claim 12 wherein the detecting means comprises a load sensor measuring forces generated between the sheet material and the cutting blade.

15. An automatically controlled cutting machine for cutting limp sheet material with a closed loop control comprising:

a reciprocated cutting blade *having a sharp leading knife edge for cutting through and severing the material on each side of the blade;* a cutting table having a bed for supporting the limp sheet material in a spread condition during cutting;

*motor means for advancing the blade and the limp sheet material relative to one another along a line of cut with the limp sheet material severed by the sharp leading knife edge closely engaging and pressing against the sides of the blade;* vacuum means associated with the sheet material spread on the bed of the cutting table for rigidizing the limp material *pressing against the sides of the blade* during cutting;

sensing means cooperatively connected with the cutting blade for detecting a cutting load parameter affected by the interaction of the blade and the rigidized material during cutting; and closed loop control means connected with the sensing means and responsive to the sensed cutting load parameter for controlling the cutting blade in accordance with cutting conditions manifested by the sensed parameter as the material is cut.

16. An automatically controlled cutting machine for cutting sheet material as defined in claim 15 wherein the cutting table has a penetrable bed penetrated by the reciprocated cutting blade during cutting.

17. An automatically controlled cutting machine as defined in claim 16 wherein the vacuum means is connected with the penetrable bed of the cutting table for evacuating air from the sheet material through the bed.

[18. The combination of claim 12 wherein:

the automatically controlled cutting machine includes programmed cutting control means for generating fundamental machine command signals including blade orientation signals for guiding the cutting blade tangentially along the predefined cutting path;

the detecting means provides feedback signals representative of blade side loads; and the reacting means receives the feedback signals and produces supplemental blade orientation signals which modify the fundamental orientation signals and orientation of the cutting blade.]

19. The combination of claim [18] *30* wherein the programmed cutting control means in the automatically controlled cutting machine includes in addition to the cutting program producing fundamental command signals another program having a fixed schedule of supplemental blade orientation commands that are combined with the fundamental commands whereby the cutting blade is guided in cutting engagement with the sheet material by the combination; and the reacting means receiving the feedback signals cooperates with the program of supplemental commands and generates supplemental commands from the fixed schedule in accordance with the feedback signals received.

20. An automatically controlled cutting machine for cutting limp sheet material comprising:

a thin cutting blade having a sharp leading cutting edge which is advanced in cutting engagement with the sheet material and a trailing edge spaced from and generally parallel to the leading edge;

a support table defining a surface on which the limp sheet material is laid in a spread condition;

translating means for advancing the cutting blade and the sheet material relative to one another in cutting engagement with the sharp leading cutting edge of the blade extending generally perpendicular to the support surface of the table;

orientation means for rotating the cutting blade and [a] *the* sheet material relative to one another about an axis generally perpendicular to the surface of the table;

sensing means operatively associated with the cutting blade for detecting unbalanced lateral blade loading and the corresponding blade deflection away from the axis perpendicular to the cutting table; and feedback control means connected with and responsive to the sensing means and also connected in controlling relationship with the orientation means to rotate the leading cutting edge of the blade about the perpendicular axis and toward the side of the blade having the higher loading in response to detected blade deflection and thereby reduce blade deflection.

21. An automatically controlled cutting machine as defined in claim 20 wherein: the sensing means also detects fore-and-aft blade deflection; and the feedback control means is connected with the translating means to reduce the feed rate of the cutting blade and sheet material relative to one another in response to the detected fore-and-aft deflection.

22. An automatically controlled cutting machine as defined in claim 20 wherein: the cutting blade is a reciprocated cutting blade.

23. An automatically controlled cutting machine as defined in claim 20 wherein the sensing means comprises a blade position sensor.

*24. An automatically controlled cutting machine as described in claim 1,8 or 11 wherein:*

*the control means for guiding the cutting blade through the material includes means for establishing the rate at which the cutting blade and the sheet material are moved relative to one another along a cutting path; and*

*the feedback means is interconnected with the control means for adjusting the rate at which the blade and material are moved relative to one another in response to the lateral force signals from the sensing means.*

*25. An automatically controlled cutting machine as described in claim 24 wherein the feedback means is connected with the control means for reducing the rate at which the blade and material are moved relative to one another as the lateral force signals increase.*

*26. The combination of claim 12 in an automatically controlled cutting machine in which the displacement means establishes the rate of displacement of the cutting blade along the line of cut wherein the displacement means is connected with the detecting means and responsive to the detecting means to reduce the rate of displacement of the blade according to the blade side loads.*

*27. An automatically controlled cutting machine as defined in claim 20 or 22 wherein the feedback control means is also connected with the translating means to reduce the feed rate of the cutting blade and sheet material relative to one another in response to unbalanced lateral blade loading detected by the sensing means.*

*28. An automatically controlled cutting machine for accurately cutting limp sheet material comprising:*

*a cutting blade having a sharp, leading cutting edge, a trailing edge and sides extending between the leading and trailing edges;*

*a cutting table defining a support surface on which sheet material is positioned in a spread condition for cutting by the cutting blade;*

*motor means for moving the cutting blade and the sheet material relative to one another in cutting engagement;*

*control means connected with the motor means and providing control signals to the motor means for guiding the cutting blade through the material along a predetermined cutting path;*

*a presser foot surrounding the cutting blade and resting on the sheet material during cutting;*

*a blade guide mounted in the presser foot and supporting the blade along an axis extending generally perpendicular to the sheet material spread on the cutting table;*

*sensing means including a load sensor mounted in the presser foot and interposed between the blade guide and the cutting machine for detecting lateral forces applied to the sides of the blade by the material as the blade advances through the material in cutting engagement, the sensing means also producing a signal corresponding to the detected lateral forces; and*

*feedback means interconnecting the sensing means and the control means for generating additional control signals to regulate the cutting of the material by the blade along the predetermined cutting path in response to the detected forces.*

*29. An automatically controlled cutting machine for accurately cutting limp sheet material comprising:*

*a reciprocating cutting blade having a sharp, leading cutting edge, a trailing edge and sides extending between the leading and trailing edges;*

*a cutting table having a penetrable bed including bristles having free ends substantially in a common plane and defining a support surface on which the sheet material is positioned in a spread condition for cutting by the cutting blade, the blade penetrating through the support surface and between the bristles during cutting;*

*motor means for moving the cutting blade and the sheet material relative to one another in cutting engagement;*

*control means connected with the motor means and providing control signals to the motor means for guiding the cutting blade through the material along a predetermined cutting path;*

*sensing means operatively associated with the cutting blade and sheet material for detecting lateral forces applied to the sides of the blade by the material as the blade advances through the material in cutting engagement, the sensing means also producing a signal corresponding to the detected lateral forces; and*

*feedback means interconnecting the sensing means and the control means for generating additional control signals to regulate the cutting of the material by the blade along the predetermined cutting path in response to the detected forces.*

*30. In combination in an automatically controlled cutting machine having a cutting blade in the form of a knife having a sharp, leading cutting edge which translates relative to sheet material in a spread condition, the cutting machine including displacement means for guiding the sharp, leading cutting edge of the blade in cutting engagement with the material along a predefined line of cut and means for orienting the cutting blade about an axis generally perpendicular to the sheet material at each point along the line of cut, the improvement comprising:*

*programmed cutting control means connected with the displacement means and the orienting means for generating fundamental machine command signals including blade orientation signals for guiding the cutting blade tangentially along the predefined line of cut;*

*detecting means for producing feedback signals defining blade side loads generated by the interaction of the cutting blade and the sheet material as the blade is guided tangentially along the line of cut; and*

*reacting means responsive to the feedback signals for generating supplemental blade orientation signals which modify the fundamental orientation signals, and for applying the modified orientation signals to the orienting means to reduce blade side loads.*

* * * * *